United States Patent
Sagoe-Crentsil et al.

(10) Patent No.: US 10,669,214 B2
(45) Date of Patent: Jun. 2, 2020

(54) CELLULAR GEOPOLYMER PRODUCT

(71) Applicant: Commonwealth Scientific and Industrial Research Organisation, Clayton (AU)

(72) Inventors: Kwesi Kurentsir Sagoe-Crentsil, Aspendale Gardens (AU); David Alan Devenish, Glen Iris (AU); Genrietta Shapiro, East St Kilda (AU); Shiqin Yan, Mulgrave (AU); Leigh Gesthuizen, Melbourne (AU); Trevor Brown, Beaumaris (AU)

(73) Assignee: Commonwealth Scientific and Industrial Research Organisation, Clayton (AU)

( * ) Notice: Subject to any disclaimer, the term of this patent is extended or adjusted under 35 U.S.C. 154(b) by 0 days.

(21) Appl. No.: 14/348,331

(22) PCT Filed: Sep. 28, 2012

(86) PCT No.: PCT/AU2012/001192
§ 371 (c)(1),
(2) Date: Mar. 28, 2014

(87) PCT Pub. No.: WO2013/044324
PCT Pub. Date: Apr. 4, 2013

(65) Prior Publication Data
US 2014/0238265 A1    Aug. 28, 2014

(30) Foreign Application Priority Data
Sep. 30, 2011 (AU) ................................ 2011904044

(51) Int. Cl.
*C04B 38/02* (2006.01)
*C04B 28/00* (2006.01)
(Continued)

(52) U.S. Cl.
CPC ............ *C04B 38/02* (2013.01); *C04B 28/006* (2013.01); *C04B 40/0032* (2013.01);
(Continued)

(58) Field of Classification Search
CPC .......... C04B 28/006–008; C04B 22/04; C04B 38/02; C04B 12/005; Y02P 40/165
See application file for complete search history.

(56) References Cited

U.S. PATENT DOCUMENTS 4,533,393 A * 8/1985 Neuschaeffer .......... C04B 12/04
106/18.12
4,837,114 A * 6/1989 Hamada ................ H01F 1/0572
148/302
(Continued)

FOREIGN PATENT DOCUMENTS

CN 1802335 A 7/2006
EP 0530902 A1 3/1993
(Continued)

OTHER PUBLICATIONS

Machine translation of Japanese Patent Publication No. JP 2000-169255 A, originally published Jun. 20, 2000, 5 pages.*
(Continued)

*Primary Examiner* — Matthew J Daniels
*Assistant Examiner* — Hana C Page
(74) *Attorney, Agent, or Firm* — McCarter & English, LLP; Maria Laccotripe Zacharakis

(57) ABSTRACT

A method for manufacturing a cellular geopolymer product, which method comprises the steps: (a) forming an activated geopolymer premix by addition to a geopolymer premix of an activator compound that initiates a condensation reaction in the geopolymer premix; (b) casting the activated geopolymer premix in a desired configuration; and (c) generating gas bubbles in the activated geopolymer premix as the
(Continued)

Process flow for foamed geopolymer products condensation reaction proceeds and the activated geopolymer premix stiffens to produce a self-supporting cellular structure; and (d) curing the self-supporting cellular structure to produce the cellular geopolymer product, wherein in step (c) the characteristics of the activated geopolymer premix and the reaction kinetics of the condensation reaction are controlled to achieve formation of the self-supporting cellular structure.

11 Claims, 1 Drawing Sheet

(51) Int. Cl.
*C04B 40/00* (2006.01)
*C04B 111/32* (2006.01)

(52) U.S. Cl.
CPC ......... *C04B 2111/32* (2013.01); *Y02P 40/165* (2015.11); *Y02W 30/92* (2015.05); *Y02W 30/94* (2015.05)

(56) References Cited

U.S. PATENT DOCUMENTS

| | | | | |
|---|---|---|---|---|
| 4,925,711 | A | * | 5/1990 | Akao ................ B31B 37/00 206/524.1 |
| 5,244,726 | A | | 9/1993 | Laney et al. |
| 5,885,321 | A | * | 3/1999 | Higa ................ B22F 9/24 75/362 |
| 2006/0243169 | A1 | * | 11/2006 | Mak et al. |
| 2007/0144407 | A1 | * | 6/2007 | Biscan ................ C04B 18/027 106/819 |
| 2009/0050022 | A1 | | 2/2009 | Birch |

FOREIGN PATENT DOCUMENTS

| | | | | |
|---|---|---|---|---|
| JP | 2000169255 | A | * 6/2000 | |
| RU | 2368574 | C1 | * 9/2009 | ............. C04B 28/18 |
| WO | WO-2004007393 | A1 | * 1/2004 | ............. C04B 28/18 |
| WO | 2004063124 | A1 | 7/2004 | |

OTHER PUBLICATIONS

Machine translation of International Patent Application Publication No. WO 2004/007393 A1, originally published Jan. 22, 2004, 8 pages (Year: 2004).*
Machine translation of Russian Patent Publication No. RU-2368574C1, originally published Sep. 27, 2009, 8 pages (Year: 2009).*
International Search Report, Application No. PCT/AU2012/001192, dated Oct. 25, 2012.
International Preliminary Report on Patentability PCT/AU2012/001192 dated Aug. 23, 2013.
Aguilar, R. Arellano et al., "Lightweight concretes of activated metakaolin-fly ash binders, with blast furnace slag aggregates" Construction and Building Materials (avialable online on Jan. 25, 2012), vol. 24, pp. 1166-1175.
Supplemental EP Search Report, dated May 8, 2015.
Divya Khale et al: "Mechanism of geoploymerazation and factors influencing its development review", Journal of Materials Science, Kluwer Academic Publishers, BO, vol. 42, No. 3, Jan. 20, 2007, pp. 729-746 Divya Khale.
Duxson, et al.: "Geopolymer technology: the current state of the art", Journal of Materials Science, Kluwer Academic Publishers BO, vol. 42, No. 9, Dec. 19, 2006, pp. 2917-2933.
Kani et al., Efflorescence Control in Geopolymer Binders Based on Natural Pozzolan. Cement and Concrete Composites. Jan. 2012;34(1):25-33.
Le-Ping et al., Preparation of Phosphoric Acid-based Porous Geopolymer. Applied Clay Science. 2010;50:600-603.

* cited by examiner

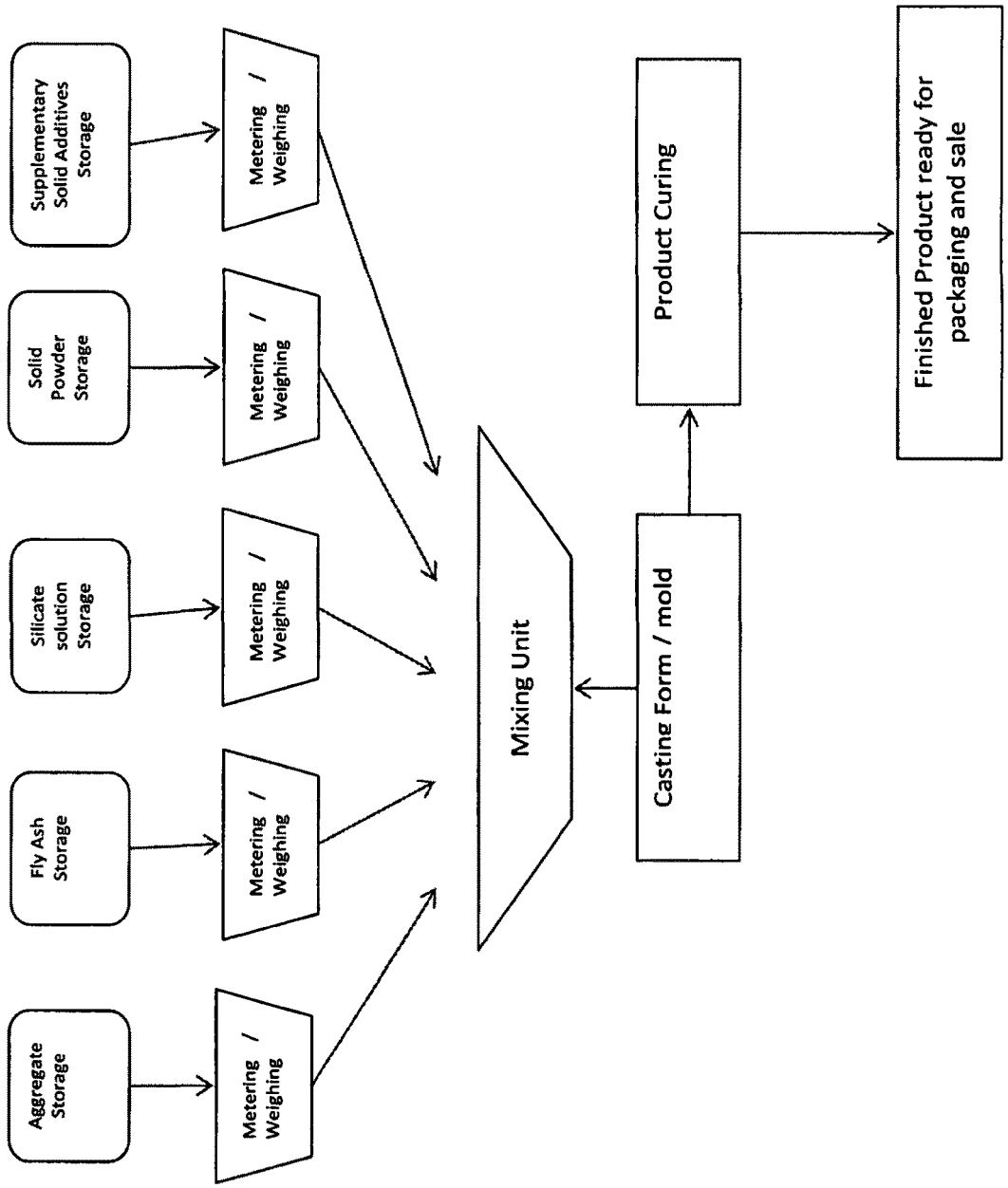

CELLULAR GEOPOLYMER PRODUCT

RELATED APPLICATIONS

This application is a 35 U.S.C. § 371 National Stage filing of International Application No. PCT/AU2012/001192 filed on Sep. 28, 2012, which claims the benefit of Australian Patent Application No. 2011904044 filed on Sep. 30, 2011. The entire contents of each of the foregoing applications are explicitly incorporated herein by reference.

TECHNICAL FIELD OF THE INVENTION

The present invention relates to a geopolymer product, to processes for making the product and to uses of the product.

BACKGROUND OF INVENTION

Cement-based materials are used extensively in the construction industry. These materials exhibit a number of desirable properties but their use should also take into account certain limitations. For example, cementitious materials can exhibit a wide range of deformation due to loading, moisture and/or thermal effects. Further, the combination of internal chemical processes e.g. hydration, and loss of water with the drying of concrete, can result in large dimensional changes leading to cracking for building elements subjected to restraint. In addition, creep is another time dependant material factor contributing to dimensional changes. These issues can be particularly problematic in the case of cement-based wall panels since significant movements will cause widening of joints and/or cracking that may present an unsightly aesthetic problem or allow the ingress of moisture through joints into buildings or to reinforcements causing corrosion and degradation of concrete.

Cement-based building materials also tend to exhibit a relatively high carbon footprint since the production of constituent ingredients tends to be energy intensive.

Against this background, it would be desirable to provide an alternative material that can be used in the building industry, or related industries such as mining and oil and gas sectors, that does not suffer the property-based limitations of cement-based materials. It would also be desirable to provide an alternative to cement-based materials that has a lower carbon footprint.

SUMMARY OF THE INVENTION

Accordingly, in one embodiment the present invention provides a method for manufacturing a cellular geopolymer product, which method comprises the steps:
(a) forming an activated geopolymer premix by addition to a geopolymer premix of an activator compound that initiates a condensation reaction in the geopolymer premix;
(b) casting the activated geopolymer premix in a desired configuration; and
(c) generating gas bubbles in the activated geopolymer premix as the condensation reaction proceeds and the activated geopolymer premix stiffens to produce a self-supporting cellular structure; and
(d) curing the self-supporting cellular structure to produce the cellular geopolymer product,
wherein in step (c) the characteristics of the activated geopolymer premix and the reaction kinetics of the condensation reaction are controlled to achieve formation of the self-supporting cellular structure.

Herein the term geopolymer denotes a mineral/inorganic polymer. Geopolymers and their formation is generally known in the art.

In accordance with the present invention a cellular geopolymer structure is prepared by controlling stiffening of a geopolymer premix and the generation (and expansion) of gas bubbles in the premix in order to produce a cellular structure exhibiting desirable structural and associated physical properties. This control delivers desired progressive cell wall rigidity inducing increasing resistance to gas expansion and gas release rate as determined by generated pressure associated with casting in a formwork (mould) which further triggers compression of the walls of gas bubbles. This contributes to the development of the self-supporting capacity of the geopolymer matrix.

The rate at which the geopolymer premix stiffens is determined by the reaction kinetics of the condensation reaction that commences when the premix is activated using an activator compound. The viscosity of the premix when generation of gas bubbles is commenced, the rate at which the condensation reaction proceeds (and thus the rate at which viscosity increases) and the rate at which gas bubbles are generated within the premix will contribute to the process profile by which the cellular product is produced. In turn a variety of factors will influence each of these process variables. This means that there is a significant amount of process control that may be achieved using the present invention.

The present invention also provides a cellular geopolymer product when produced in accordance with the method of the invention.

Also provided is the use of a cellular geopolymer product in accordance with the present invention as a building/construction component. The cellular geopolymer of the invention may be used instead of conventional cement-based building/construction materials, taking into account of course the properties of the cellular geopolymer and the intended usage. The present invention may provide a range of cellular products that exhibit both structural (or non-structural) and insulating properties and that are at least comparable to those of the conventional products. Within the construction sector, the demand for such materials is continuously rising while use of the conventional cement-based cellular materials is restrained due to performance limitations and high environmental impact factors.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

BRIEF DESCRIPTION OF DRAWINGS

Embodiments of the present invention are illustrated with reference to the accompanying non-limiting drawings in which:

FIG. 1 is a flow chart illustrating how the process of the invention may be implemented.

DETAILED DISCUSSION OF THE INVENTION

Central to the present invention is the control of process variables so that gas bubbles are generated in the premix, the premix stiffness thereby effectively trappings gas bubble to provide a product with a cellular structure. Relevant process variables include the chemical composition of source materials making up the geopolymer premix, the composition and dosage of the activator compound, the rheology of the geopolymer premix, and kinetics associated with generation of gas bubbles within the premix. These variables may be tailored and optimised to influence the properties of the final cellular product.

Herein the various process variables are broadly embraced by the expression "characteristics of the activated geopolymer premix". The activated geopolymer premix should exhibit certain properties prior to casting that influence how the premix behaves when it is cast in terms of the generation and migration of gas bubbles within the premix and condensation reaction within the premix. These characteristics will influence product characteristics and properties.

It is imperative that the process of premix preparation is properly conducted in order to achieve a premix with the required initial consistency (flow), sufficient pot life and appropriate rates of the viscosity increase (stiffening) in order to provide a premix that exhibits sufficient self-supporting capacity during the process of expansion as gas bubbles are generated in the premix. The gradual increase in viscosity has to be maintained at the rates that enable mix to rise up to the expected level without collapsing. In a view of matching the rates of expansion and stiffening, which is a fundamental requirement for product manufacturing, the rheological behaviour of the premix has to be controlled to ensure that the initial workability of the premix is appropriate in order to facilitate the gas generation within the mix; and that after expansion is achieved, the workability gradually changes at optimal rates in order to encase the bubbles. In the context of casting, the premix must have a plasticity and workability, suited to optimum discharge and placement, flowable movement around reinforcement and fittings etc. yet have sufficient influence on the controlled volume change during the aeration stage. The most important challenge during the mixing stage relates to controlling the onset of gas generation to provide a reasonable time 'window' for placement and casting.

Relevant parameters of the activated geopolymer premix prior to casting include viscosity, temperature, the extent of gassing and pot life.

In relation to viscosity, typically the viscosity immediately before casting is 155-175 mm in accordance with ASTMC 1437-07 (Standard test method for flow of hydraulic cement mortar).

The temperature of the activated geopolymer premix immediately before casting may be 18-34° C., preferably 20-28° C. As will be discussed later, the order in which reagents are mixed may influence mix temperature.

Generally gassing will be achieved by incorporation into the premix prior to casting of a suitable gas generating agent. Gas generation will commence during formulation of the premix and it is desired that gas generation continues after the premix has been cast. The kinetics of the gas-generating reaction(s), the amount of gas generating agent used and the time between formation of the premix and casting will need to be considered in this regard. Preferably, after casting gas generation continues in the premix to achieve a volume increase of the premix of 30-90% (based on the volume of ungassed premix) depending upon the target density to be achieved in the final product. During casting the condensation reaction proceeds and the premix stiffens such that this volume increase is preserved.

Preferably, the gas-generating agent is aluminium powder or a gas-generating reagent including aluminium powder. Aluminium reacts in the alkali environment of the premix to produce bubbles of hydrogen gas that expand in the premix. The reaction is heat-activated, the optimal activation temperature being from 25 to 45° C. Gas-generating agents suitable for incorporation into the premix are commercially available. Use of this kind of technique is intended to cause gas generation throughout the premix to achieve a homogeneous porosity profile. Where selected aluminum powder generally will contain particles with sizes ranging between 40-80 microns. The surface of the particles may be oxidized/passivated in order to reduce/optimize reactivity of the aluminum in the highly alkaline environment of the geopolymer.

When using a heat-activated gas-generating agent, the method usually involves controlling the temperature of the premix to within the temperature range necessary for gas generation to take place. The premix may be heated in a variety of ways and may be carried out either when mixing the components of the premix with water (typically within 5-20 minutes of adding water to the premix components) and/or when casting of the premix in a formwork. Elevation of premix temperature may also be achieved by using pre-heated materials and/or by exploiting the energy imparted by the apparatus used for mixing, such as a high shear mixer.

The aeration of the geopolymer premix with aluminium is similar to that used in the production of conventional aerated cement products. In both cases gassing occurs as a result of hydrogen evolution, causing the premix to expand, followed by the stage of setting and hardening. In the present invention the dynamic relationship between gas generation and setting/hardening of the premix is controlled in order to develop desirable structural features and product characteristics.

The pot life of the premix is the working time available following mixing of components to form the premix to casting of the premix in a suitably configured mould. The pot life should be sufficiently long to allow for transfer from mixing apparatus to mould but not so short that the premix characteristics have changed to the extent that the premix does not have the requisite characteristics for casting. As a general, in guide in practice, the pot life may be from 10-90 minutes.

The temperature at which the premix is formed may influence pot life. If the premix temperature is relatively high (e.g., 30-40° C.), the gas generating reaction may be very vigorous thereby resulting in a reduced pot life when compared with lower temperatures (e.g., below 30° C.). Factors that may influence premix temperature include prevailing climatic condition, the temperature of individual premix components and heat produced during the mixing process. In relation to the temperature of individual premix components, it may be relevant to consider whether preparation of individual components in situ or immediately prior to mixing will generate heat as a result of exothermic reaction. For example, it is known that formation of silicate solutions liberate considerable heat. Advantage may be taken of this or, if undesired, cooling may be undertaken prior to premix formulation. It has been observed that forming the premix at elevated temperature may lead to short pot life but enhanced compressive strength in the product, whereas formulating the premix at lower temperature may lead to longer pot life and reduced product variability with respect to density/porosity. This is because using a premix with extended pot life allows enhanced delivery and moulding, and close confinement.

Geopolymers are generally known in the art. Geopolymer binder synthesis basically involves the reaction silica and alumina species with alkalis and alkali-polysilicates to form an aluminosilicate gel network structure through a dissolution and condensation reaction process. The principal raw feedstock materials required for this class of binders may be derived from both extractive and processing mineral resources such as fly ash or clays. The combination of enhanced mechanical performance and lower carbon footprint of geopolymer systems compared to conventional Portland cement (OPC) binders provides new opportunities for development of environmentally attractive and commercially viable building products.

The properties of geopolymer binder systems are largely controlled by the reaction chemistry of $SiO_2$, $Al_2O_3$ and other minor oxides present in its highly alkaline environment. The basic mechanisms of the geopolymerisation reaction involve an initial dissolution step in which Al and Si ions are released in the alkali medium. Transport and hydrolysis of dissolved species are followed by a polycondensation step, forming 3-D network of silico-aluminate structures. These structures can be of three types: Poly (sialate) (—Si—O—Al—O—), Poly (sialate-siloxo) (Si—O—Al—O—Si—O), and Poly (sialate-disiloxo) (Si—O—Al—O—Si—O—Si—O).

The chemical processes governing polymerization reactions of $Al_2O_3$ and $SiO_2$ in these systems are largely controlled by stability of the respective speciated phases. X-ray diffraction (XRD) analysis shows geopolymers to be largely amorphous although there is published evidence of occurrence of nanocrystalline particles within the geopolymer matrix structure. Correspondingly, in the alkaline aqueous solutions of geopolymers, aluminum is present mostly as monomeric aluminate ions $(Al(OH)^{4-})$. Thus, all the aluminum present in solution is in IV-fold coordination irrespective of the coordination of the aluminum in the precursor. Silicon by contrast forms a variety of oligomeric ions, particularly at high concentrations and high $SiO_2/M_2O$ (M=Na, K) ratios.

Unlike the well understood roles of oxide components comprising the hydrated gel phases present in $CaO$—$Al_2O_3$—$SiO_2$ systems i.e., Portland and pozzolanic cements, the equivalent contributions of oxide components governing polymerisation reactions and, hence, geopolymer properties are now only beginning to emerge. Accordingly, the reaction pathways required to achieve desired engineering performance of geopolymer systems is becoming increasingly important. Especially so, since the properties of Geopolymer systems are particularly dependent on reaction chemistry given its characteristic multiphase structure.

In accordance with the present invention an activated geopolymer premix is formed by mixing of suitable feedstock and activator compound components. This step involves mixing of suitably proportioned (solid and liquid) components of the geopolymer premix and this initiates an immediate dissolution process releasing aluminate and silicate ions into solution, with concurrent hydrolysis reactions of dissolved ions. Depending on the pH regime and oxide concentrations, the resultant species in the liquid phase may comprise monomeric $[Al(OH)_4]^-$, $[SiO_2(OH)_2]^{2-}$ and $[SiO(OH)_3]^-$ or similar. The aluminate and silicate species subsequently begin the condensation process, initially giving aluminosilicate monomers and perhaps oligomers. These ions further condense with one another to produce a gel phase while the mixture starts to set. It should be noted that the condensation between Al and Si species occurs more readily due to the characteristic high activity of species such as $[Al(OH)_4]^-$. For $[SiO(OH)_3]^-$ and $[SiO_2(OH)_2]^{2-}$, although the latter species is more capable of condensing with $[Al(OH)_4]^-$ since there exists a larger attraction, they are likely to produce only small aluminosilicate oligomers. Condensation reactions continue within the gel phase with the silicate/aluminate ions continuing to dissolve from the solid and onset of initial hardening. Re-dissolution of the gel and/or precipitation of less soluble and more stable aluminosilicate species may occur or the geopolymer hardens completely as condensation reactions rapidly escalate. Over a long period of time, the condensation reactions continue but at a decreasing rate. The rigidity of the gel and reduced free water greatly reduce the rate of dissolution of the original aluminosilicate solid.

A variety of complex microstructures can characterize geopolymer systems depending upon selected premix composition. It is apparent that there is a maximum $SiO_2/Al_2O_3$ ratio which is favorable in producing high strength geopolymers. Accordingly, the most favorable $SiO_2/Al_2O_3$ molar ratio for geopolymer strength is about 1.5 to 3.5. For this, $Na_2O/Al_2O_3$ ratio is about unity in the geopolymer premix.

Compressive strength of the cellular product of the invention is related to both composition and microstructure. These general observations and their implications on feedstock material selection may be best understood by examining the fundamental dissolution and condensation reactions occurring during synthesis. Compared with hydration reactions in ordinary Portland cements, condensation in geopolymers appears to be more complex due to the existence of a variety of oligomeric silicate species. The process may be further complicated by the overlap of dissolution processes, hydrolysis and condensation reactions, which regulates the speciation conditions for condensation. In this context, the continuously changing environment of concentration of various species and the pH value of the liquid phase also remains critical. In accordance with the present invention the selection of the key parameters, methods of operational control are critical in order to obtain the target properties of the product.

After the geopolymer premix and suitable activator compound have been mixed, the activated premix is cast in a formwork for shaping in a desired configuration. Casting may take place immediately after mixing or after a predetermined time after mixing has been undertaken. One thing that is important here is that the activated premix has a suitable rheology to allow gas bubbles to be generated within the premix. If the premix is too viscous, gas bubbles may not readily be formed. If the premix is not viscous enough gas bubbles may form but migrate too quickly and escape from the premix.

The kinetics of the condensation reaction and of gas bubble generation are also relevant considerations. After casting the activated premix will begin to stiffen as the geopolymer condensation reaction proceeds. The rate at which this takes place is also important. At the same time gas bubbles are generated within the premix. If the premix stiffens unduly, formation of gas bubbles will not be able to take place. Desirably though the premix should stiffen during generation (and expansion) of gas bubbles as this has the effect of capturing the gas bubbles thereby contributing to the desirable properties of the final cellular product. In practice the process of the invention involves balancing independent processes, namely condensation and aeration, and in particular at what point in time and the rate at which these processes take place. The characteristics of the premix are also important, as noted.

The present invention stipulates specific combinations of process parameters to deliver controlled reaction process. Some relevant process variables are included in the following table and further specific details are given later.

|  | Stage 1: Dissolution | Stage 2: Hydrolysis | Stage 3: Aeration/ stiffening process | Stage 4: Condensation/ setting |
|---|---|---|---|---|
| Material Parameters | Feedstock chemical composition | Al content; Si/Al ratio of system | Activating agent reactivity | Calcium ion content |
| Process Variables | pH, temperature and concentration of the aluminosilicate solution | Concentration of the aluminate species in solution available hydroxyl ions | Activation agent reactivity. Mix rheology. Alkali concentration Time/temperature. | Temperature. Calcium-ion content |
| Reaction rate parameters | Mixing intensity | Time/temperature System Alkalinity | Rate of pressurising and Gas evolution | Condensation reaction kinetics; Time and temperature |

A formwork is used for shaping the premix into the desired configuration. Since gassing results in a volume increase of the premix, the formwork is under-filled, usually from 30 to 50% by volume of the formwork mould. In the embodiment described above the foamed premix is confined in the formwork in order to contribute to the desired porosity profile. Confinement may involve using a formwork with a lid in order to restrain rising of the premix and cause collapsing of the expanding premix on contact with the lid. For suitable confinement the lid and formwork surfaces in contact with the premix must have sufficient stiffness and thermal stability to provide resistance against uplift pressure and any heat generated during gassing of the premix. The lid is preferably fabricated in such a way so as to allow gas dissipation when gas bubbles collapse at the premix/lid interface. For instance, the lid may be lined with a semi-cellular membrane of fabric or mesh to facilitate gas dissipation. The various surfaces of the formwork in contact with the premix (including the lid) may include surface relief in order to produce a patterned surface on the product.

Alternatively, the formwork used does not include a lid and collapsing of the expanding premix may be achieved by techniques such as screeding, trowelling, cutting and/or rolling. Depending upon the equipment used screeding and/or trowelling may be carried out with vibration. In this case repeated application of such techniques may be required to achieve the desired effect. It will be appreciated that these techniques are in themselves forms of "confinement" since they promote bubble collapsing (at the surface of the premix).

As a further alternative the formwork does not include a lid and no particular steps are taken to avoid rising of premix at the top of the formwork. In this case after curing the cellular product will invariably require cutting to provide a suitable upper surface to the product.

The generation of gas bubbles in the premix will increase the volume occupied by the premix. Thus, the premix rises (in the formwork/mould) being used. Depending upon the viscosity of the premix gas bubbles may rise to the upper surface of it where they may either escape (if no lid is used) or be caused to collapse (if a lid is used). In accordance with the present invention the production of gas bubbles within the premix is controlled relative to the condensation reaction that proceeds in the premix and that causes the premix to stiffen. The intention is to produce a cellular structure that is uniform within the bulk of the product with respect to size and distribution of open cells (voids). The product may exhibit more densified regions at surfaces in contact with the walls of the formwork due to bubble collapsing. The upper surface of the product may also be relatively dense due to release of gas bubbles or collapsing of gas bubbles (by contact with a lid). The cellular structure that is produced is retained on curing of the self-supporting cellular structure.

The wall surfaces of the formwork may also cause collapsing of the expanding mixture in contact with their surfaces. Collapsing of the expanding mixture results in production of a relatively dense skin at the outer surfaces of the product, particularly where aerating gas discharge and/or collapse occurs. Though perhaps minimal the floor of the formwork may also cause some bubble collapsing although migration of bubbles away from the floor is likely to be responsible for formation of a less cellular outer region there. The use of an appropriate vibration technique will also assist with upward bubble migration and help densify the bottom skin region that is in contact with the formwork.

In an embodiment of the invention the entire formwork may be vibrated vertically and/or laterally at an appropriate frequency (e.g. 50 Hz in the case of vertical vibration and from 1 to 5 Hz in the case of lateral vibration) and amplitude in order to achieve an even distribution of slurry within the formwork, to control the cross-sectional bubble distribution and/or to improve the quality of finish of the product surfaces. Vibration may assist migration of gas bubbles up through the premix resulting in increased density at lower regions of the premix. Vibration may also lead to increased density at upper regions of the premix caused by migration and collapsing of bubbles due to confinement. As noted, confinement of the upper surface of the premix may be achieved by use of a lid, or by screeding, trowelling and/or rolling.

As the condensation reaction proceeds the geopolymer will stiffen to such an extent that it becomes self-supporting. The result is a self-supporting cellular structure comprising gas bubbles retained in geopolymer matrix. This cellular structure can then be cured under conventional conditions for geopolymer systems.

The geopolymer product produced in accordance with the present invention tends to have a uniform density/porosity across its cross-section. Depending upon confinement, the product also typically has a uniform crust (exterior walls). The crust is typically 0.5 to 10 mm thick with little porosity distribution between the crusts. The characteristics of the crust tend to be influenced by premix viscosity, material grading, hardening rate, pressure and rate of gas loss from the premix. More fluid mixes tend to generate a thicker crust. The fines content of the premix and rate of fines migration will also influence crust formation.

This is because migration of gas bubbles also involves transport of water and entrained fines. This process is notionally similar to bleed water in conventional OPC systems.

In terms of product features and benefits, the following may be mentioned:

To provide a cement-free cellular material having relatively low densities, ranging between 900 and 1750 kg/m$^3$, that exhibit good mechanical strength (compressive strength typically of 5 MPa to 28 MPa and MOR (Modulus of Rupture) of 1 MPa to 4 MPa at 28 days), low drying shrinkage/creep of the order of 800 to 1000 micro-strain at 56 days, creep of the order of 300 to 500 microns and minimized environmental footprint.

To develop a method of manufacturing of such product based on the process of simultaneous (in-situ, direct) casting and aeration.

To deliver self supporting capacity of the matrix material in order to incorporate/trap gas bubbles.

To provide a uniform close-porosity structure.

To control the process of the structure formation and, specifically, the self supporting capacity of the mix during aeration process by:
 controlling the chemical composition of source materials;
 controlled dosage calcium-bearing component content;
 controlling mix rheology; and
 optimizing process variables.

The following is a summary of embodiments of the present invention.

The product is a cellular (foamed) geopolymer material/product having a structure with uniform porosity/closed porosity/macro-porous, having a density of 900-1750 kg/m3 and compressive strength of 5-28 MPa.

With respect to structure, walls of the pores may be sufficiently dense (or effectively densified) to compensate for the loss of strength due to the incorporation of gas bubbles The external surfaces may be formed with relatively dense skin to enhance durability and prevent leachability. A dense skin/crust on the top of the product is generally about 0.5 to 10 mm thick.

The methodology of the present invention enables development of a self-supportive structure during gassing/foaming and expansion; where the rates of foaming and rates of expansion are optimized in order to prevent slumping to provide a product of a pre-designed volume.

Generally, the method involves the following considerations.

Precisely calculated calcium component is an integral part of the precursor and leads to the formation of calcium silicate phase and sodium aluminosilicate phases that contribute to the unique properties of the product.

Formation of calcium silicate phase and sodium aluminosilicate phases are formed simultaneously during the processes of chemical (alkali) and mechanical (mixing) activation.

The dissolution of the precursor is the first reaction to take place and provide an amount of dissolved Calcium and other species to promote the reactions of the geopolymerisation.

The degree of polymerization is achieved in controlled manner and will provide a self-supporting capacity of the mix within a required time window in order to capture the gas bubbles (pores) that are produced during the process.

The process of geopolymerisation includes dissolution; precipitation and gelation is controlled by (a) precise chemical formulation of the starting matrix material/precursor material and (b) major process variables.

The geopolymeric precursor is dosed with predetermined amounts of Fly Ash class F and Ca-containing component (BF slag) based on the preliminary chemical analysis of the starting materials.

The process of synthesis of the geopolymeric mixture is controlled in a way that enables development of the self-supporting structure during the stage of mix expansion.

The major process variables for development of the self-supporting structure are self-generated pressure within the geopolymeric material (15 to 50 KPa, preferably 20 to 40 KPa) due to gas generation, design of the formwork/enclosure.

a) Required parameters during the binder preparation stage includes: a) sufficient mixing time for homogenization and initiation of the dissolution, duration is a subject to the precursor composition and particle sizes and b) delay time prior to introduction of the gas generating agent subject to the gelation rates of the given composition, and c) temperature);

b) Viscosity and temperature of the activator (230-300 Pa·s, T—22-25 Deg.C)

Method as claimed in claim 1, where hydrogen gas is generated in-situ by using gas generating agent.

Where chemical composition of the precursor material is formulated to provide an optimal rates of the reactions of hydrolysis and precipitation and thus enable to control the properties of the end product The geopolymer product produced in accordance with the invention may be prone to efflorescence, i.e., the formation of salt deposits on or near the product surface causing discoloration. Whilst not believed to be detrimental to product properties, these salt deposits are unsightly and the premix from which the product is formed may include an additive to prevent efflorescence. Useful additives are known in the art and include calcium aluminates, cement, metakaolin, calcium formate and aqueous water repellents, such as glycerol. Additionally or alternatively, efflorescence can be minimised or prevented by application of a surface coating, such as an acrylic coating, to the product. Efflorescence may be caused by ingress of water into the product and the coating is therefore applied to those surfaces of the product that in use are likely to come into contact with water.

According to this FIGURE a premix is formulated by blending of various ingredients from (aggregate, fly ash etc.). Each component is weighed/metered and delivered into a mixing unit. As mix up proceeds the premix rheology will reach an optimum so that the premix is ready for moulding. The point in time at which premix is transferred from the mixing unit to the mould will vary as between different formulations and can be determined for a given formulation by experimentation. The time taken to deliver the premix to the mould and the extrusion characteristics will also be relevant here since the condensation reaction and gas generation in the premix is ongoing. After moulding, the product may be cut into desired lengths (this step not shown) before the product is conveyed to a curing chamber for curing. After curing, the finished product is ready for packaging and sale. Of course, for efficiency, the process will be automated. The invention may have particular utility in preparing structural building materials.

Embodiments of the present invention are illustrated with reference to the following non-limiting examples.

EXAMPLE 1

The following tables give generic compositional details for two premix formulations.

TABLE 1

| | |
|---|---|
| Sand | 750-1420 kg |
| Fly ash | 120-280 kg |
| Calcium rich compound (e.g. blast furnace slag or Portland cement) | 35-120 kg |
| Alkali silicate solution (30-40% solids by weight) | 260-460 kg |
| Gas generating agent (e.g. aluminium powder) | 0.6-1.2 kg |

It has been found that this composition may be used to give a product density of up to 1200 kg/m$^3$.

TABLE 2

| | |
|---|---|
| Sand | 1035 kg |
| Fly ash | 150-320 kg |
| Calcium rich compound (e.g. blast furnace slag or Portland cement | 20-250 kg |
| Alkali silicate solution (30-40% solids by weight) | 180-520 kg |
| Gas generating agent (e.g. aluminium powder) | 0.19-2.14 kg |

It has been found that this composition may be used to give a product density of up to 1500 kg/m$^3$.

The ratio of components used, the extent of confinement and the extent of gassing may influence product density.

EXAMPLE 2

In broad terms the geopolymer product may be prepared using the following steps.
1. Formwork (Mould) Preparation
   Clean, assemble and oil mould, place reinforcement and any fittings, attached clean fabric to confinement plate. Pre-heat underside of mould to 32-48° C.
2. Mix and Mixing
   Mix batch ingredients and discharge to hopper. Rapid transfer of premix to mould area, noting pot life of premix.
3. Mix Placement and Mould Closure
   Discharge and distribute premix into mould. Place confinement plate on mould and clamp to mould.
4. Curing
   Commence heat curing cycle which increases product temperature to 45-95° C.; more preferably, 65-80° C. for 3.5-12 hours. Curing stopped and cooled.
5. Product Removal
   Disassemble mould, lift and remove panel to storage.

EXAMPLE 3

This example also illustrates how the invention may be implemented.
Mixing
   The mixer used is a typical pan mixer (or similar high shear mixer) using a rotating bowl and a fixed mixing star, having 3 paddles, located eccentrically to mixer bowl centreline.
Casting Formwork
   The formwork consists of a steel vibrating table of the type conventionally used for concrete pre-casting. Also required is a confinement plate designed to withstand some 50 KPa internal pressure, generated when mix foams and expands pressurizing confinement plate. For curing purposes, steam heating is provided to the underside of the table.
Manufacturing Steps
Mixing
   Prior to commencement, all materials have been batched up and solid ingredients have been added to the mixer bowl.
   Mixing commences with dry materials which are mixed.
   Chemical binder is added and mixed.
   The activator (with small amount of water) is added then mixed.
   Mix discharged into hopper on underside.
Mix Placement
   Mix is then transferred into formwork
Confinement
   The confinement plate is positioned on formwork.
Curing
   Curing is commenced using steam.
Product Removal
   Confinement plate and formwork are removed.
   The product is then lifted off the table/formwork and placed into storage.
Mix and Product Details

| Mix Ingredients and Masses | | | |
|---|---|---|---|
| Ingredients | | Qty | UOM |
| Aggregate | Sand | 333 | Kg |
| Binder solids | Fly Ash + slag | 235.5 | Kg |
| Chemical Binder | Silicate solution | 111.6 | Kg |
| Activator + water | — | 1.96 | Kg |
| | Total batch mass = | 682 | Kg |
| | Total batch volume = | 0.31 | cum |

The invention claimed is:
1. A method for manufacturing a cellular geopolymer product, which method comprises the following steps:
   (a) forming an activated geopolymer premix by addition to a geopolymer premix of an activator compound that initiates a condensation reaction in the geopolymer premix;
   (b) incorporating a gas generating agent in the activated geopolymer premix, wherein (i) the gas generating agent is aluminum powder consisting of aluminum particles having a particle size of 40-80 microns; (ii) the surface of the particles of aluminum powder is oxidized in order to reduce/optimize the reactivity of the aluminum in the activated geopolymer premix; and (iii) wherein the amount of aluminum powder is between about 0.009% and about 0.15% by weight of the activated geopolymer premix;
   (c) casting the activated geopolymer premix in a mould in a desired configuration;
   (d) allowing gas bubbles to be generated in the activated geopolymer premix as the condensation reaction proceeds and the activated geopolymer premix stiffens to produce a self-supporting cellular structure; and
   (e) curing the self-supporting cellular structure to produce the cellular geopolymer product, wherein the geopolymer product has a $SiO_2/Al_2O_3$ molar ratio of 1.5 to 3.5, wherein the viscosity of the activated premix when generation of gas bubbles in the activated premix is commenced, the rate at which the condensation reaction proceeds and the rate at which gas bubbles are generated in the activated geopolymer premix are controlled to achieve in step (d) formation of the self-supporting cellular structure, and wherein gas bubbles at an upper surface of the activated geopolymer premix are caused to collapse thereby producing a skin on the upper surface of the activated geopolymer premix having a density greater than the remaining activated geopolymer premix.

2. The method of claim 1, wherein the viscosity of the activated geopolymer premix immediately before casting is 155-175 mm in accordance with ASTMC 1437-07.

3. The method of claim 1, wherein the temperature of the activated geopolymer premix immediately before casting is 18-34° C.

4. The method of claim 1, wherein after casting gas generation continues in the premix to achieve a volume increase of the premix of 30-90% (based on the volume of ungassed premix).

5. The method of claim 1, wherein gas bubbles are generated in the premix by including in the premix aluminium powder and the temperature of the premix is 25 to 45° C.

6. The method of claim 1, wherein the activated geopolymer premix has a pot life of 10 to 90 minutes.

7. The method of claim 1, wherein the temperature at which the activated geopolymer premix is formed is from 30 to 40° C.

8. The method of claim 1, wherein the temperature at which the activated geopolymer premix is formed is less than 30° C.

9. The method of claim 1, wherein the geopolymer premix comprises an additive to prevent efflorescence in the cellular geopolymer product.

10. The method of claim 1, wherein collapsing of gas bubbles at an upper surface of the activated geopolymer premix is achieved by using a mould with a lid.

11. The method of claim 1, wherein collapsing of gas bubbles at an upper surface of the activated geopolymer premix is achieved by screeding, trowelling and/or rolling.

\* \* \* \* \*